W. A. BESSERDICH.

STEERING MECHANISM.

APPLICATION FILED JAN. 12, 1916.

Reissued Jan. 16, 1917. 14,249.

Inventor

W. A. Besserdich

Witnesses

Thomas Riley

M. Neiveomb

By W. J. Fitzgerald & Co.,

Attorneys.

UNITED STATES PATENT OFFICE.

WILLIAM AUGUST BESSERDICH, OF CLINTONVILLE, WISCONSIN, ASSIGNOR OF ONE-HALF TO BERNHARD A. MOSLING, OF CLINTONVILLE, WISCONSIN.

STEERING MECHANISM.

14,249. Specification of Reissued Letters Patent. Reissued Jan. 16, 1917.

Original No. 1,152,874, dated September 7, 1915, Serial No. 702,225, filed June 7, 1912. Renewed March 2, 1915, Serial No. 11,579. Application for reissue filed January 12, 1916. Serial No. 71,695.

*To all whom it may concern:*

Be it known that I, WILLIAM A. BESSERDICH, a citizen of the United States, residing at Clintonville, in the county of Waupaca and State of Wisconsin, have invented certain new and useful Improvements in Steering Mechanisms, &c.; and I do hereby declare the following to be a full, clear, and exact description of the invention, such as will enable others skilled in the art to which it appertains to make and use the same.

This invention relates to wheel hubs and it more particularly relates to an improved steering mechanism for automobiles and the like.

The prime object of my invention is to provide a substantially dust proof housing for my universal joint consisting of two operatively connected shells and means cooperating with such shells to adjustably secure the inner shell movably within the outer shell whereby the inner shell will be held separated from contact with the outer shell.

An object of the invention is to provide improved means in connection with the front axle of a vehicle whereby the vertical plane of a wheel may be changed while the wheel is rotated, and thereby guide the vehicle.

A further object of the invention is to provide a device of this character which is substantially dust proof.

A still further object of the invention is to provide an improved arrangement of roller bearings on which the wheel hub rotates.

A still further object is to provide a device of this character which is compact, strong, durable and thoroughly efficient.

Other objects and advantages may be recited hereinafter and in the claims.

Figure 1:
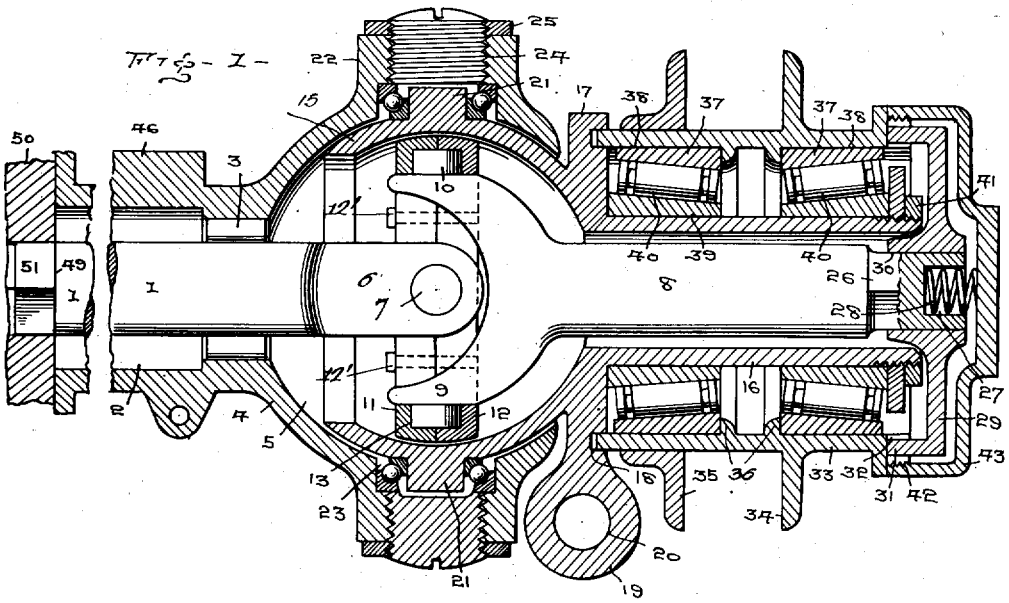
Figure 2:
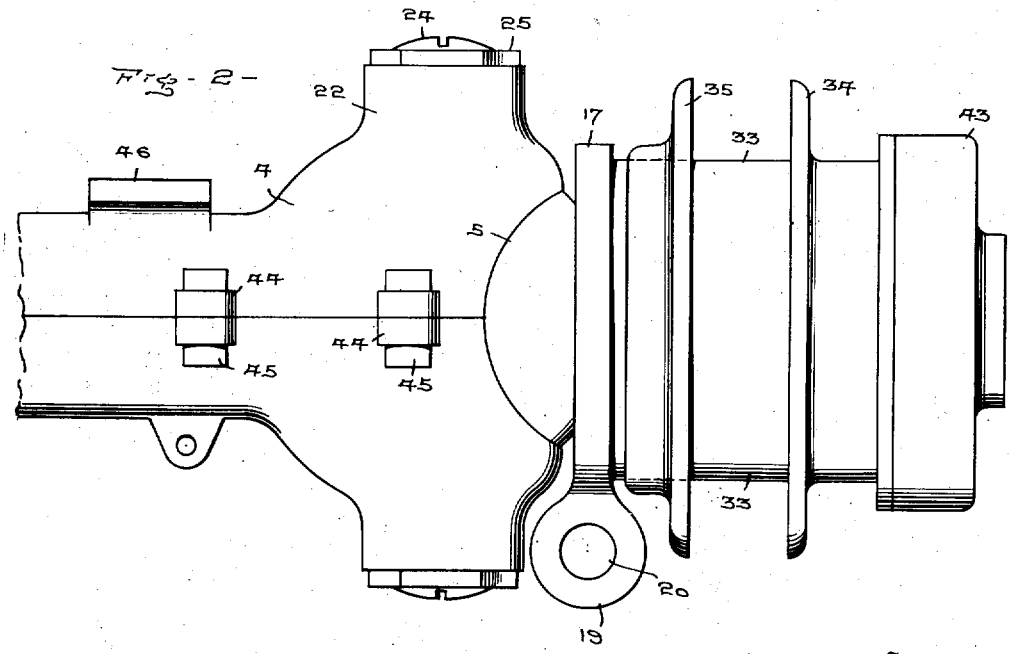

In the accompanying drawings which form a part of this application, Figure 1 is a vertical longitudinal sectional view through the mechanism which constitutes my invention, and, Fig. 2 is an elevation view of the same.

Referring to these drawings, in which similar reference characters correspond with similar parts throughout the several views, the numeral 1 designates a fragmental end portion of the front axle of the vehicle, said axle being adapted to rotate within a housing 2; any suitable form of bearings 3 being provided between said axle and said housing. The housing 2 is integrally united with a second housing 4 which is of substantially spherical contour, and having a substantially spherical chamber 5 into which a bifurcated end 6, of the axle 1, extends. Trunnions 7 are formed upon the bifurcated ends 6. A stub axle 8 is axially alined with the main axle 1, and said stub axle is provided with a bifurcated end, the furcations 9 of which are provided with the trunnions 10. Connecting rings 11 and 12, provided with semi-cylindrical apertures 13, are fitted together in such relation that the apertures register and engage the trunnions 7 and 10. These rings 11 and 12 are secured together by means of bolts 12′, and in conjunction with the bifurcated ends of the axles 1 and 8 constitute a universal joint. Said universal joint is inclosed by a substantially spherical end portion 15 of a skein member, said skein member also comprising a cylindrical portion 16 and a radial flange 17, the latter being formed around the cylindrical portion 16 and spherical portion 15 at their point of union, and being provided with an annular channel 18, in its vertical surface, the flange also being provided with a depending lug 19 having an aperture 20 therethrough.

The portion 15 of the skein is inclosed by the housing 4 with a suitable space intervening therebetween, and is provided with trunnions 21 which are rotatably seated within a pair of apertured bosses 22, the latter being formed on the housing 4, and having their apertures 23 diametrically opposed relative to the spherical housing; and while I do not limit my invention to these exact details of construction, I prefer to mount the trunnions 21 on ball bearings, ball races being sleeved over and seated at the bases of the trunnions 21, and the opposing ball races being seated within the apertured bosses 22, as shown. The apertures 23 are screw threaded for the reception of adjusting screws 24, the inner ends of which bear upon the outer ball races, and lock nuts 25 being provided for retaining the screws 24 and the ball bearings in proper adjustment for maintaining the outer surface of the portion 15 of the skein out of contact with the inner surface of the housing 4 to prevent the respective surfaces from becoming locked together by the expansion of the portion 15 when overheated. The space between the portion 15 and the housing 4 being sufficient to obviate this difficulty, but not sufficiently great to prevent the substantially spherical bodies of the portion 15 of the skein and the housing 4 from reinforcing the trunnions 21 and their ball bearing mountings when the same are subjected to undue strains.

The stub axle 8 is surrounded by the cylindrical portion or skein 16 of the housing 15, and the outer end 26 of said stub axle is square in cross section, and is provided with an aperture or spring seat 27 for receiving a spring 28. A hub engaging member or disk 29 is provided with a central and squared aperture 30 and thereby adapted to be seated upon the portion 26 of the stub axle, so as to rotate therewith. The disk 29 is provided with lugs 31 which are seated within the apertures 32, in an end of a hub member or barrel 33, said barrel being provided with a radial flange 34, which together with a flanged ring 35, constitutes an annular seat for the ends of wheel spokes (not shown). The barrel is provided with internal flanges 36, against which roller bearing races 37 are seated, said races being snugly fitted against the inner wall of the barrel, and being secured against rotation by means of keys 38. Roller bearing races 39 are snugly fitted upon the cylindrical portion of the skein member 16, and may be secured in position by any proper means (not shown). All of the bearing races are tapered in cross section, the direction of taper of the races 37 being opposite to that of the races 39, so that the roller bearings 40, when placed therebetween, have their axes inclined with relation to the stub axle 8; and it will be seen, in Fig. 1, that, by moving the barrel 33 to the left, the left-hand race 37 will be tightened upon the left-hand rollers 40, and that by tightening the adjusted nut 41, the right hand race 39 will be moved leftward, so as to tighten upon the right-hand rollers 40.

One end of the shaft 1 is squared and is fitted into a central aperture in a transmission member 50. The outer end of the barrel is threaded at 42 for engagement with a cap 43, against which the spring 28 is seated, and in coöperation therewith, holds the left shoulder 49, of the squared end portion 51, against the differential gear member 50, so as to prevent undue longitudinal movement of the shaft relative to the barrel 33, and to keep the universal joint from rattling when the bearings thereof have become worn. The left hand end of the barrel 33 extends into the annular groove 18 and coacts therewith for excluding dust, sand or the like from the roller bearings. Between the flanges 36 is provided an annular space or groove which may be filled with vaseline or any similar lubricating material, so that if the bearings and barrel should become unduly heated, the vaseline will melt and flow between the roller bearings, so as to properly lubricate and reduce the heat of the bearings.

The housing 4 is horizontally divisible, being formed in sections, as shown in Fig. 2, said sections being provided with apertured lugs 44, bolts 45 being seated in the apertures of the lugs for holding the two sections in unity. The upper section is provided with a spring seat 46, and any proper means (not shown) may be employed for securing the same to the spring of an automobile or other vehicle. By thus making the casing or housing 4 divisible, the lower section thereof may be removed when it is desired to repair the universal joint or to replace any of the parts thereof, so that access may be had to the interior of the spherical portion 15, for removing or replacing the bolts 12′ which hold the rings 11 and 12 together.

An arm, lever or other proper means (not shown) may be secured to the lug 19, the aperture 20 providing a practical means for connecting the same; and it will be readily seen, that by simply manipulating the lug 19, the skein member and the elements carried thereby may be swung on an arc of a circle having the centers of the trunnions 21 as its axis, and thereby direct the movement of a vehicle having wheels equipped with the improved construction. It will also be readily seen that when the axle 1 is rotated, the stub axle 8 and the hub or barrel 33 will also rotate through the medium of the universal joint, within the skein member, regardless of the relative positions of the axles 1 and 8, and the heated condition of the skein and its substantially spherical portion 15 within the housing 4.

It is obvious that I have provided a thoroughly practical and efficient device of this character which is fully capable of attaining the foregoing objects.

I do not limit my invention to the exact details of construction, combination and arrangement of parts, as herewith illustrated and described, but my invention may only be limited by a reasonable interpretation of the claims.

I claim:—

1. The combination with a universal joint having shafts, of a spherical housing therefor comprising an outer casing and an inner casing operatively positioned within the outer casing and having an intervening space therebetween, tubular extensions on said casings to receive said shafts, bosses upon said outer casing having internal threads formed therein, trunnions upon said inner casing disposed within said bosses, and adjusting screws mounted within the threaded portions of the bosses of said outer casing and having their inner ends operatively connected with the trunnions within said bosses, whereby to adjustably maintain the inner casing in spaced relation within the outer casing.

2. The combination with a universal joint having shafts, of a spherical housing therefor comprising an outer casing and an inner casing operatively positioned within the outer casing and having an intervening space therebetween, tubular extensions on said casings to receive said shafts, bosses upon said outer casing having internal threads formed therein, trunnions upon said inner casing disposed within said bosses, bearings within said bosses for said trunnions, and adjusting screws mounted within the threaded portions of the bosses of said outer casing and having their inner ends engaging the bearings within said bosses, whereby to adjustably maintain the inner casing in spaced relation within the outer casing.

3. The combination with a universal joint having shafts, of a spherical housing therefor comprising an outer casing and an inner casing operatively positioned within the outer casing and having an intervening space therebetween, tubular extensions on said casings to receive said shafts, bosses upon said outer casing having internal threads and annular recesses formed therein, trunnions upon said inner casing disposed within the recesses of said bosses, ball bearing rings seated in said recesses, ball bearing rings surrounding said trunnions, anti-friction balls interposed between said rings, and adjusting screws mounted within the threaded portions of the bosses of said outer casing and having their inner ends engaging the rings within the recesses of said bosses, whereby to adjustably maintain the inner casing in spaced relation within the outer casing.

4. The combination with a universal joint having shafts, of a spherical housing therefor, said housing comprising an outer casing and an inner casing operatively positioned within the outer casing and having an intervening space therebetween, tubular extensions on said casings to receive said shafts, oppositely disposed apertured bosses upon said outer casing having internally threaded portions and annular recesses formed therein at the inner ends of said threaded portions, oppositely disposed trunnions upon said inner casing disposed within the recesses of said bosses in spaced relation thereto, rings seated in said recesses and provided with raceways in their inner edges, rings surrounding said trunnions of less diameter than the rings in said recesses and provided with raceways in their outer edges, anti-friction balls interposed between said rings and operating within the respective raceways, adjusting screws mounted within the threaded portions of the bosses of said outer casing and having their inner ends engaging the rings within the recesses of said bosses whereby to adjustably maintain the inner casing in proper spaced relation within the outer casing, and lock nuts threaded upon the outer end portions of said adjusting screws for maintaining the same in their respective adjusted positions.

WILLIAM AUGUST BESSERDICH.